United States Patent [19]

Boyd

[11] Patent Number: 4,542,868

[45] Date of Patent: Sep. 24, 1985

[54] TRAILING EDGE DEVICE FOR AN AIRFOIL

[75] Inventor: James A. Boyd, Westlake Village, Calif.

[73] Assignee: Lockheed Corporation, Burbank, Calif.

[21] Appl. No.: 682,499

[22] Filed: Dec. 18, 1984

Related U.S. Application Data

[63] Continuation of Ser. No. 501,318, Jun. 6, 1983, abandoned.

[51] Int. Cl.⁴ .................. B64C 23/00; B64C 21/10
[52] U.S. Cl. .................................. 244/198; 244/200; 244/215
[58] Field of Search ............... 244/35 R, 35 A, 198, 244/199, 200, 213, 215, 130

[56] References Cited

U.S. PATENT DOCUMENTS 2,011,902  8/1935  Leigh ................................ 244/213
2,800,291  7/1957  Stephans ......................... 244/200
2,950,879  8/1960  Smith ............................... 244/198

FOREIGN PATENT DOCUMENTS 804971  11/1936  France ............................. 244/213
404270  1/1934  United Kingdom ............. 244/215
503022  3/1939  United Kingdom ............. 244/215

Primary Examiner—Trygve M. Blix
Assistant Examiner—Rodney Corl
Attorney, Agent, or Firm—Louis L. Dachs

[57] ABSTRACT

The invention is a small wedge shaped flap (20) for attachment to or near the trailing edge (14) of a airfoil (10) which improves the coefficient of lift and reduces the coefficient of drag providing an overall increase in fuel ecomony at cruise conditions. In detail the wedge shaped flap (20) has a downward height (26) of between 0.5 percent to 1.5 percent of the chord (16) of the airfoil (10) and has an included angle (30) to the chord of between 15° and 45°. The wedge flap is preferably placed at distance (24) of between 0 to 1.0 percent of the chord (16) from the trailing edge (14).

3 Claims, 7 Drawing Figures

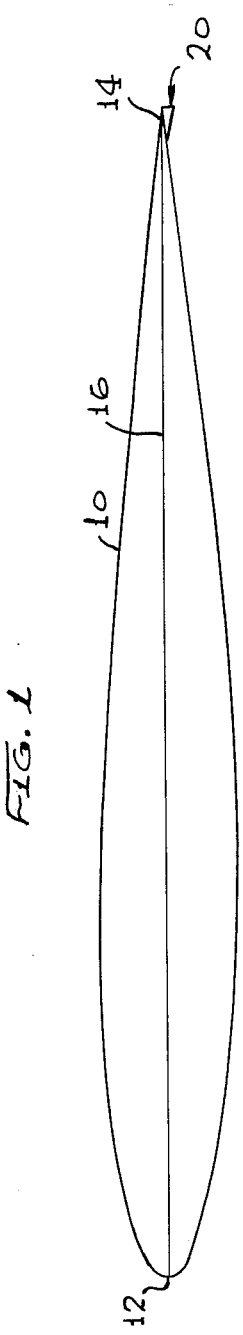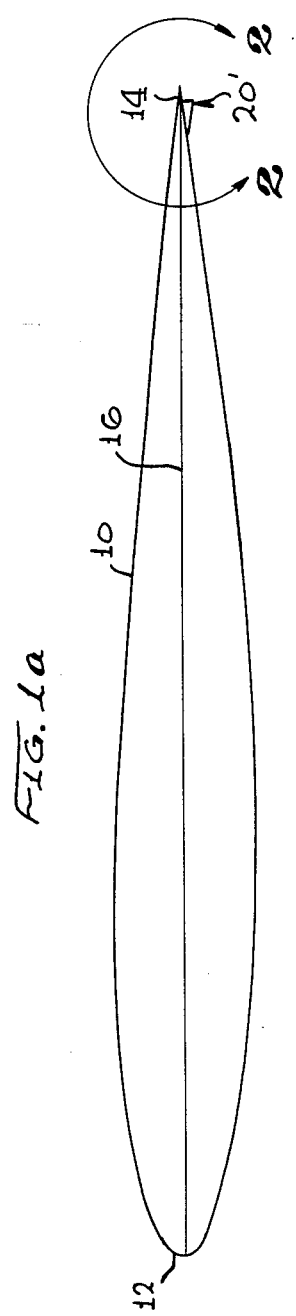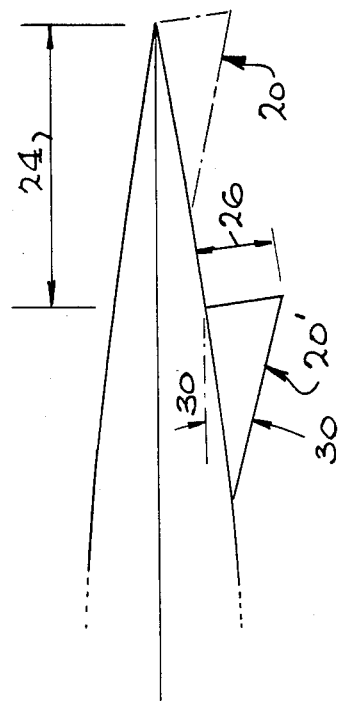

AIRFOIL W49, EFFECT OF WEDGE FLAP
M = 0.84

AIRFOIL W49, EFFECT OF WEDGE FLAP
M = 0.84

TRAILING EDGE DEVICE FOR AN AIRFOIL

This is a continuation of co-pending application Ser. No. 501,318 filed on June 6, 1983, now abandoned.

TECHNICAL FIELD

The invention relates to the field of conventional transonic airfoils for aircraft and more particularly to a trailing edge device that increases the coefficient of lift, decreases the coefficient of drag with the combined effect of reducing fuel consumption.

BACKGROUND ART

Most modern transonic transport aircraft such as Lockheed Corporation's L-1011 transport cruise at Mach numbers between approximately 0.80 and 0.87. Further increases in speed tend to cause strong shock waves on or about the airfoil (wing) which cause a marked increase in drag. At lower Mach numbers the value of the coefficient of drag is comprised mostly of induced and skin friction phenomena. The coefficient of drag increases dramatically with increasing Mach number due to wave drag and peaks at a Mach number of one or thereabouts. Thus, modern aircraft flying in this high subsonic or transonic range have airfoils designed to delay the onslaught of this wave drag above a cruise Mach number determined from initial and operating cost considerations.

This has classically been accomplished by designing the airfoil with a sophisticated curvature. For example, U.S. Pat. No. 3,952,971 "Air Foil Shaped For Flight at Subsonic Speeds," by R. T. Whitcomb, uses an upper surface contoured to control flow accelerations and pressure distributions over the upper surface to prevent or mitigate shock formation on the airfoil upper surface at flight speeds well above the critical Mach number. A more highly cambered than usual trailing edge section is provided which improves overall airfoil lifting efficiency. Unfortunately, the shape of this particular wing presents structural problems, particularly in relationship to designs for the incorporation of trailing edge flaps. Thus, the airfoils for this type of aircraft have been basically a compromise between aerodynamic efficiency and structural integrity.

It has also been recognized that wing trailing edge flaps may be deflected small amounts at cruise to improve spanwise loading and reduce drag. Of course, variations in wing camber can optimize performance over a wide range of flight conditions.

Furthermore, there have been successful attempts to increase the lift and reduce the drag of airfoils used on racing cars by incorporation of a trailing edge flap. On racing cars an inverted airfoil is often used to create downforce to better hold the car on the ground. It was discovered that a small flap projecting vertically upward normal to the chord at the trailing edge of the airfoil would increase down force by significant amounts with some reduction in drag. This automobile flap is discussed in detail in the AIAA Journal Of Aircraft, Paper No. 80-3034, entitled "Design of Air-Foils for High Lift" by Robert H. Liebeck.

What has not been hitherto exploited is the possibility of simultaneously altering chordwise loading, so as to alleviate high pressure peaks at the leading edge, and improve airfoil thickness distribution by use of an extremely small wedge flap which can easily be added to an existing wing.

Thus, it is a primary object of the subject invention to provide an airfoil design for an aircraft that substantially increases the coefficient of lift and reduces the coefficient of drag at cruise, thus providing an overall increase in fuel efficiency.

It is another object of the subject invention to provide a simple device for improving the performance of an airfoil without undue detrimental changes to the overall performance of the aircraft.

A still further object of the subject invention is to provide a device for improving performance of an airfoil for an aircraft which can easily be attached without undue structural changes.

DISCLOSURE OF THE INVENTION

The invention is a small wedgelike member (generally triangular shaped) for attachment to or near the trailing edge of a airfoil which improves the coefficient of lift and reduces the coefficient of drag providing an overall increase in fuel economy at cruise conditions. The wedge shaped member (hereafter called a wedge flap) is placed at or near the trailing edge of the airfoil. In detail the wedge flap has a downward height of between 0.4 percent to 0.8 percent of the chord of the airfoil and has an included angle to the chord (wedge angle) of between 15° and 45°, preferably between 15° and 30°. The wedge flap is placed between 0 to 1.0 percent of the chord from the trailing edge.

The novel features which are believed to be characteristic of the invention, both as to its organization and its method of operation, together with further objects and advantages thereof, will be better understood from the following description in connection with the accompanying drawings in which a presently preferred embodiment is illustrated by way of example. It is to be expressly understood, however, that the drawings are for purposes of illustration and description only, and are not intended as a definition of the limits of the invention.

BRIEF DESCRIPTION OF THE DRAWINGS

Illustrated in FIGS. 1 and 1a is a pair of cross-sectional views of an airfoil with the wedge flap attached respectively at the trailing edge and at 1.0 percent of the chord from the trailing edge.

Illustrated in FIG. 2 is an enlarged view of the trailing edge portion of the airfoil shown in FIG. 1a wherein the wedge flap is at 1.0 percent of the chord.

Figure 3:
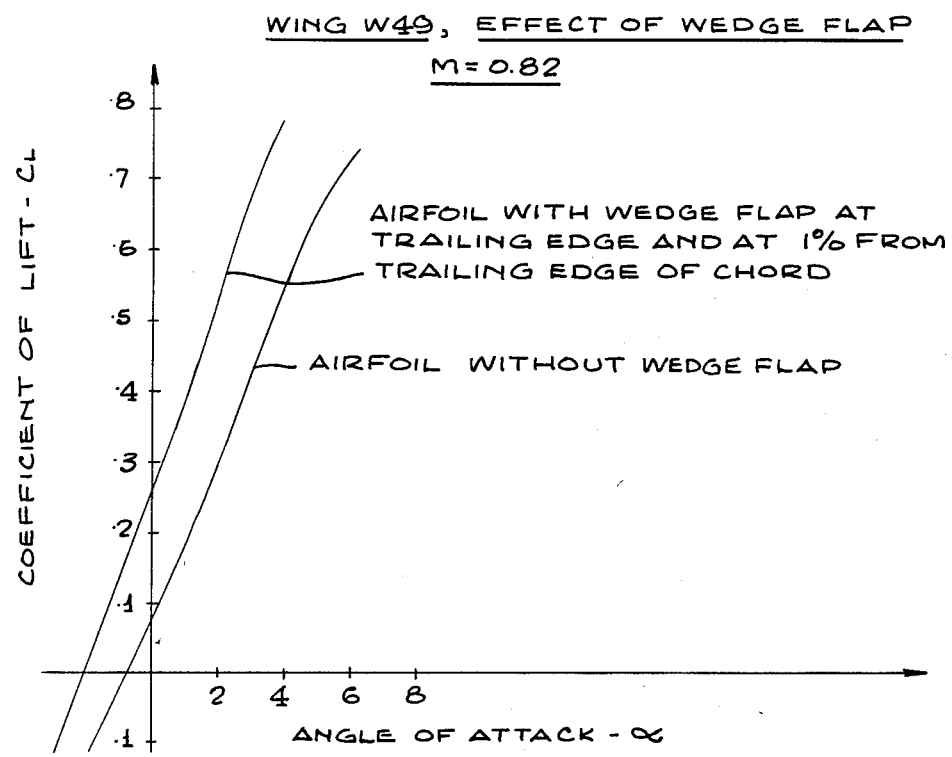

Illustrated in FIG. 3 is a graph of the calculated coefficient of lift ($C_L$) versus the angle of attack for an airfoil with and without the wedge flap installed at a Mach number of 0.82.

Figure 4:
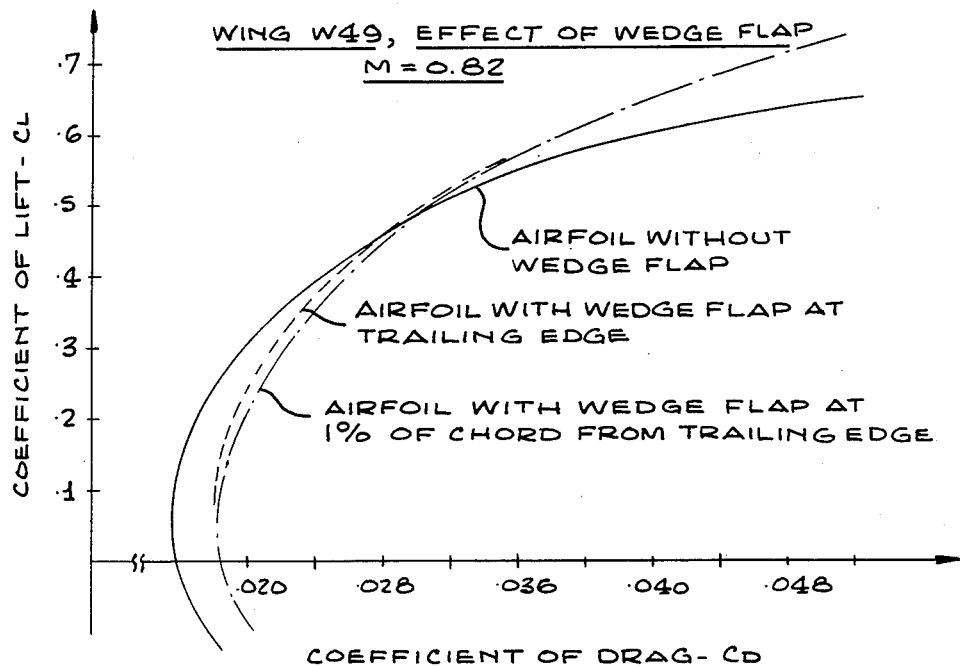

Illustrated in FIG. 4 is a graph of the coefficient of lift ($C_L$) versus the coefficient of drag ($C_D$) of actual wind tunnel test data of an airfoil with and without the flap installed at a Mach number of 0.84.

Figure 5:
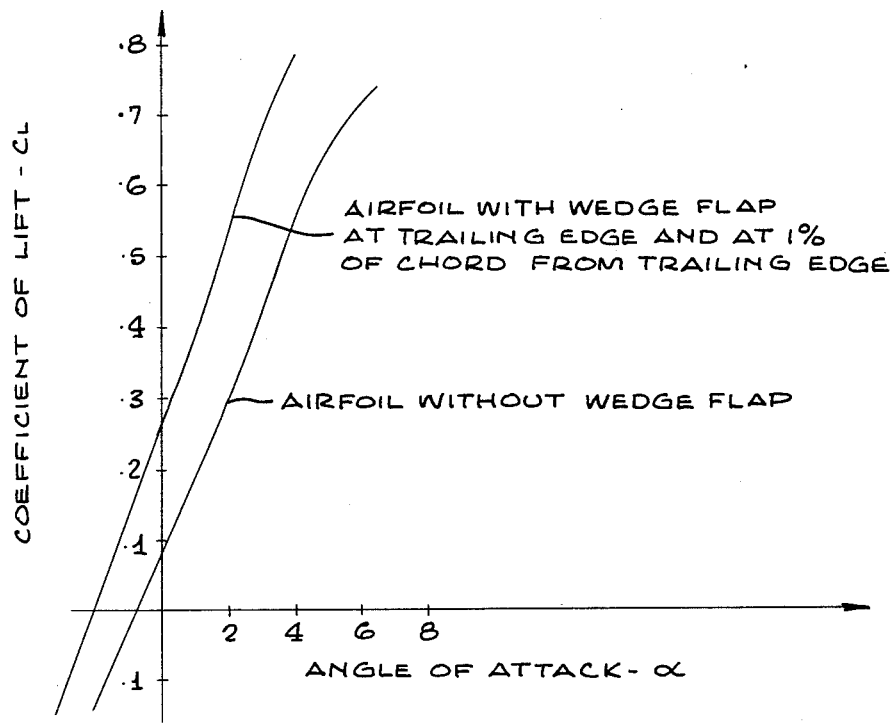

Illustrated in FIG. 5 is a graph of the coefficient of lift ($C_L$) versus the angle of attack for an airfoil with and without the wedge flap installed at Mach 0.84.

Figure 6:
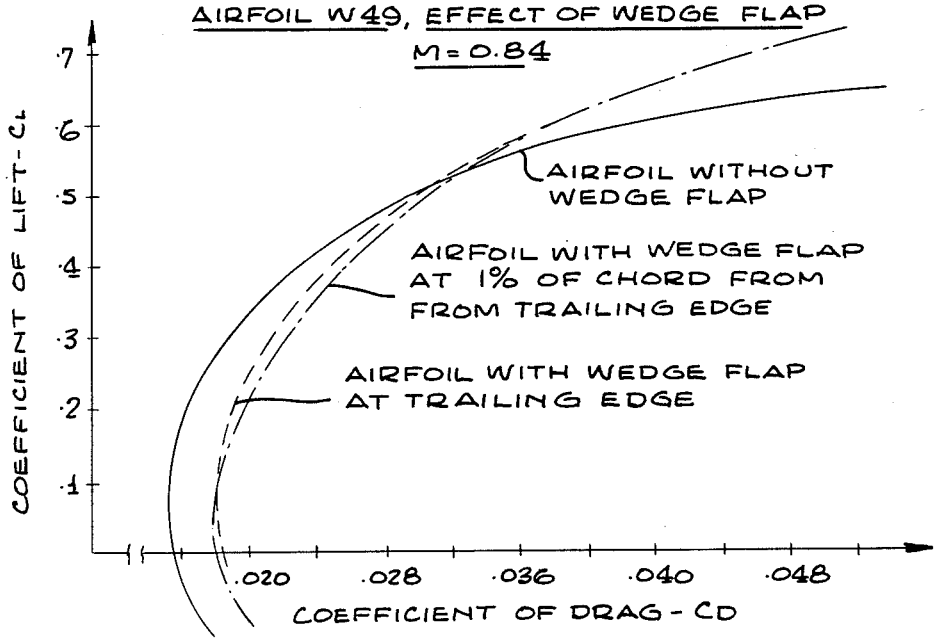

Illustrated in FIG. 6 is a graph of the coefficient of lift ($C_L$) versus the coefficient of drag ($C_D$) of actual wind tunnel test data of an airfoil with and without the wedge flap installed at a Mach number of 0.84.

BEST MODE FOR CARRYING OUT THE INVENTION

Illustrated in FIG. 1 are cross-sectional views of a typical transport airfoil design with the wedge flap installed at the trailing edge and with the wedge flap installed 1.0 percent of the chord forward of the trailing edge. FIG. 2 is an enlarged view of the trailing edge of the airfoil shown in FIG. 1. Referring to FIGS. 1 and 2 it can be seen that the airfoil, generally designated by numeral 10, has a leading edge 12 and a trailing edge 14 which defines the chord 16 of the airfoil. The improvement to the airfoil comprises installing a wedge flap 20, at a distance from the trailing edge, designated by numercal 24, which can vary from 0 to 1.0 percent of the chord 16 (the wedge flap at the 1.0 percent position is designated by numercal 20′). The wedge flap 20 has a height 26 which may be varied from 0.4 percent to 0.8 percent of the chord 16 but preferably is 0.5 percent. The downward angle 30 that the wedge flap 20 makes with the chord 16 (wedge angle) can vary between 15° and 45°, but preferably between 15° and 30°.

Illustrated in FIG. 3 is a plot of the coefficient of lift ($C_L$) versus angle of attack of the airfoil. Plotted are the airfoil without the wedge flap and the airfoil with the wedge flap at the trailing edge and at 1.0 percent of the chord forward of the trailing edge. This plot is from wind tunnel data where the Mach number was 0.82. Note that the performance of the airfoil with the wedge flap at either position is essentially identical and can be represented by a single line.

Illustrated in FIG. 4 is a plot of the coefficient of lift versus the coefficient of drag for the airfoil without the wedge flap and with the wedge flap at the trailing edge and with the wedge flap at 1.0 percent of the chord forward of the trailing edge. Here again the Mach number is 0.82. Of interest is the fact that the performance of the airfoil with the wedge flap at either position is essentially equal at a lift coefficient ($C_L$) above 0.55.

Illustrated in FIG. 5 is a plot of the coefficient of lift versus the angle of attack of the airfoil at a Mach number of 0.84. The airfoil again having the wedge flap at the trailing edge and at 1.0 percent of the chord forward of the trailing edge and also a plot of the airfoil without the wedge flap. Again note that the performance of the airfoil with the wedge flap at either position is essentially identical and can be represented by a single lime.

Illustrated in FIG. 6 is a plot of the coefficient of lift versus the coefficient of drag at Mach number of 0.84 for the airfoil with the wedge flap at the trailing edge and at 1.0 percent of the chord forward of the trailing edge and also the airfoil without the wedge flap. A comparison with FIG. 4 shows almost identical performance.

In all these plots it can be clearly seen that the wedge flap provides a reduction in the angle of attack at any given coefficient of lift and increases the coefficient of lift over the airfoil without the wedge flap. In the plots of the coefficient of lift versus coefficient of drag the crossover point appears to be at a coefficient of lift of 0.52. Beyond a coefficient of lift of 0.55 there is a marked improvement.

It is known from classical aerodynamic theory that the lift of an airfoil is strongly influenced by the location of the point where the flow separates from the airfoil and by the direction of flow streamlines aft of the separation point. For a typical airfoil without a wedge flap, separation may occur on the upper surface, slightly ahead of the trailing edge. It is believed that the effect of the wedge flap is to create a substantial deflection of the flow on the lower surface, resulting in a decreased pressure on the upper surface. This decreased pressure allows the upper surface flow to remain attached to the trailing edge, increasing lift. For a proper combination of wedge height and angle depending upon the particular design of thee airfoil, total wake thickness (and therefore drag) is reduced. The determination of the optimum combination, of course, will be determined by test.

In most cases where there is an improvement in one or more flight performance areas, some corresponding decrease in performance is found in another. Theoretical calculations have predicted two-dimensional pressure distributions for the L-1011 with a wedge flap and showed a small negative pitching moment increment. This pitching moment increase was borne out in subsequent wind tunnel tests. This pitching moment increment is sufficiently small so that the increase in trim drag it induces does not significantly offset the decrease in airfoil drag offered by the wedge flap modification.

It should be noted that range factor is Mach number times lift over drag. The range factor is the most significant figure of merit for assessing the aerodynamic goodness of any airfoil designed for cruise efficiency. The importance of the range factor is demonstrated by the specific air range (miles flown per pound of fuel consumed) formula.

$$SAR = (a/SFC) \times M(L/D) \times (1/W_G)$$

SFC = specific fuel consumption
a = speed of sound
M (L/D) = range factor
$W_G$ = gross weight
SAR = specific air range This formula also points out the impact of gross weight ($W_G$) and of propulsion specific fuel consumption divided by the speed of sound. Consequently, in assessing aerodynamic technology for cruise efficiency, its effect on range factor, structural weight and air frame/propulsion integration must be evaluated. The specific air range formula clearly explains the importance of transonic flow for subsonic cruise aircraft. The lift to drag ratio (L/D) or ($C_L/C_D$) of a given aerodynamic configuration does not change substantially with Mach number until the drag rise due to transonic flow sets in which will cause the range factor to rapidly drop. It is, therefore, at this point the configuration will achieve its maximum range factor value.

Finally, while the wedge flap has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The subject invention has application on all subsonic aircraft and particularly those which fly at Mach numbers in the high subsonic and transonic range.

What is claimed is:

1. An improvement for a transonic airfoil of an aircraft or the like, said airfoil having a chord length defined by the leading and trailing edge of the airfoil, the improvement comprising:
   a wedge-shaped member rigidly mounted to the underside of the airfoil between 0 percent and 1.0 percent from the trailing edge, having a height of between 0.4 percent to 0.8 percent of the chord of the airfoil; and further having a wedge angle to the chord of between 15° and 45°.

2. The improvement as set forth in claim 1 wherein the wedge angle is preferably between 15° and 30°.

3. The improvement as set forth in claim 2 wherein the wedge height is 0.5 percent of the chord.

* * * * *